June 26, 1956  J. LECHER  2,752,097
METHOD AND APPARATUS FOR THE PRODUCTION
OF FINE AND ULTRAFINE PARTICLES
Filed Aug. 17, 1951  6 Sheets-Sheet 1

INVENTOR
JOSEPH LECHER
BY
Paul, Paul & Moore
ATTORNEYS

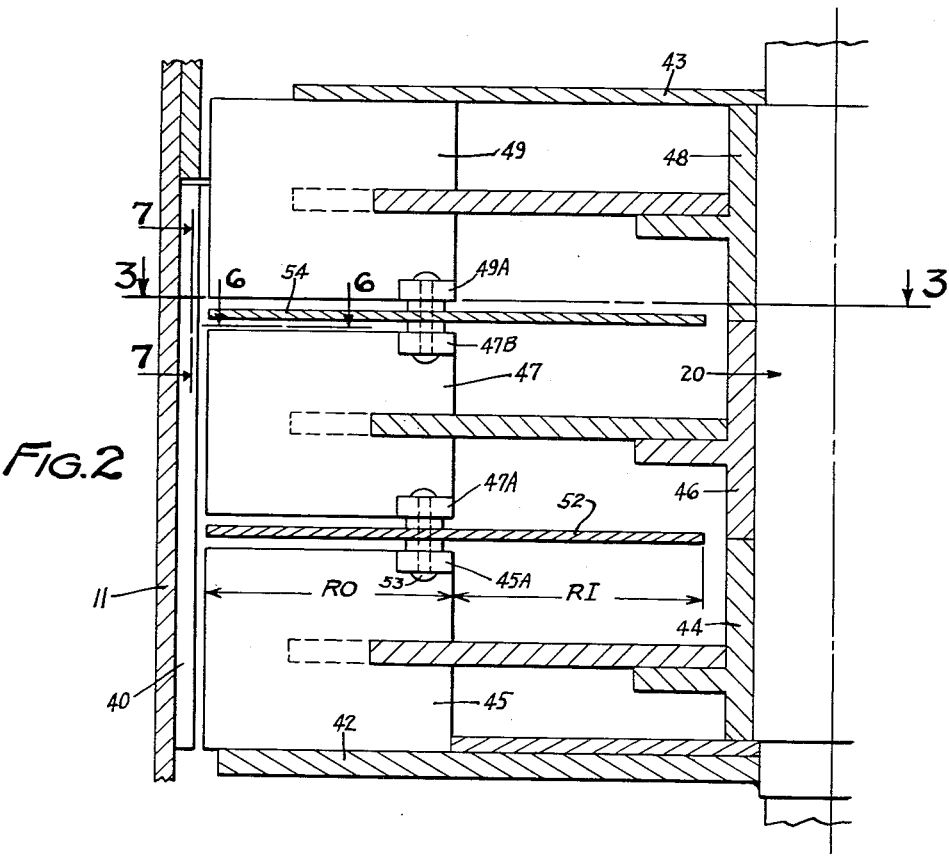
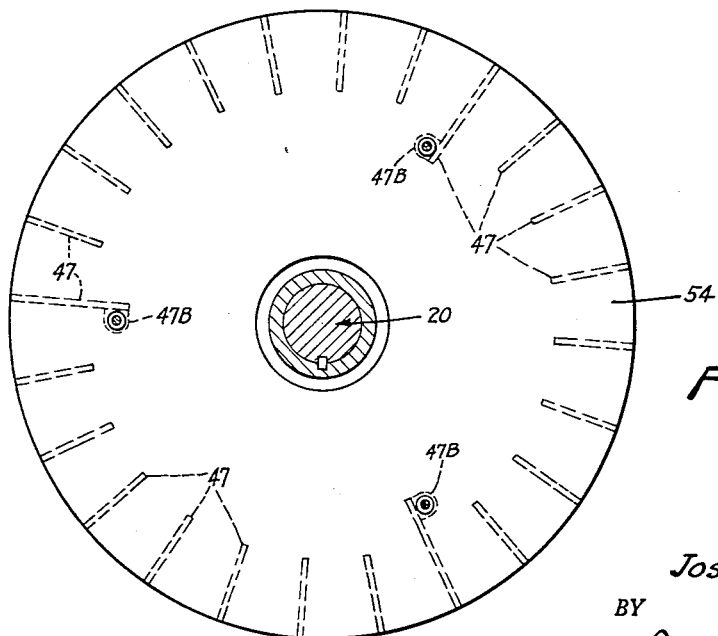

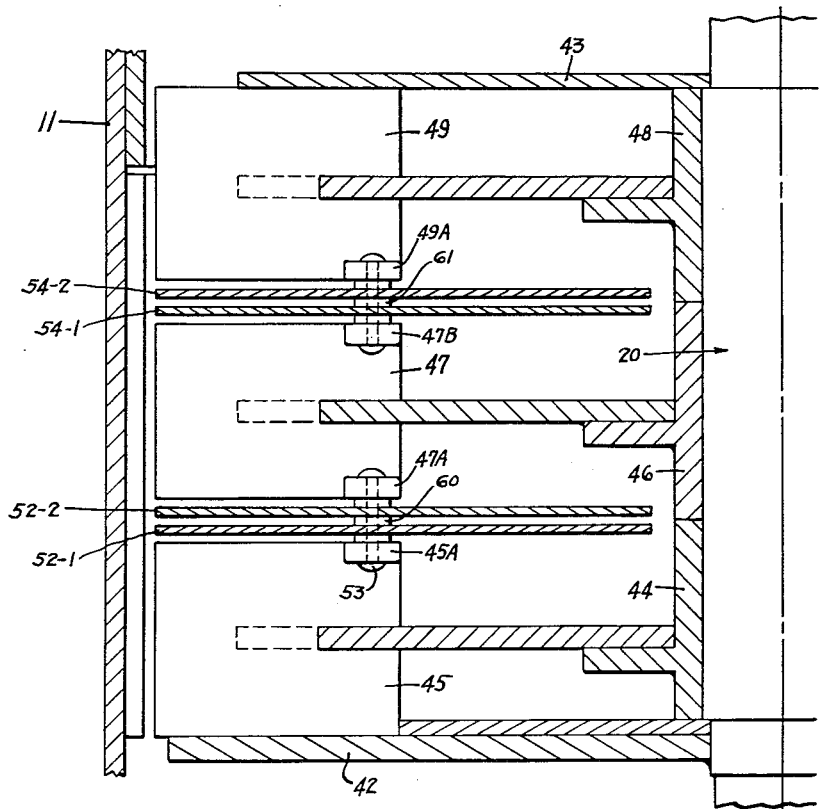
FIG.4
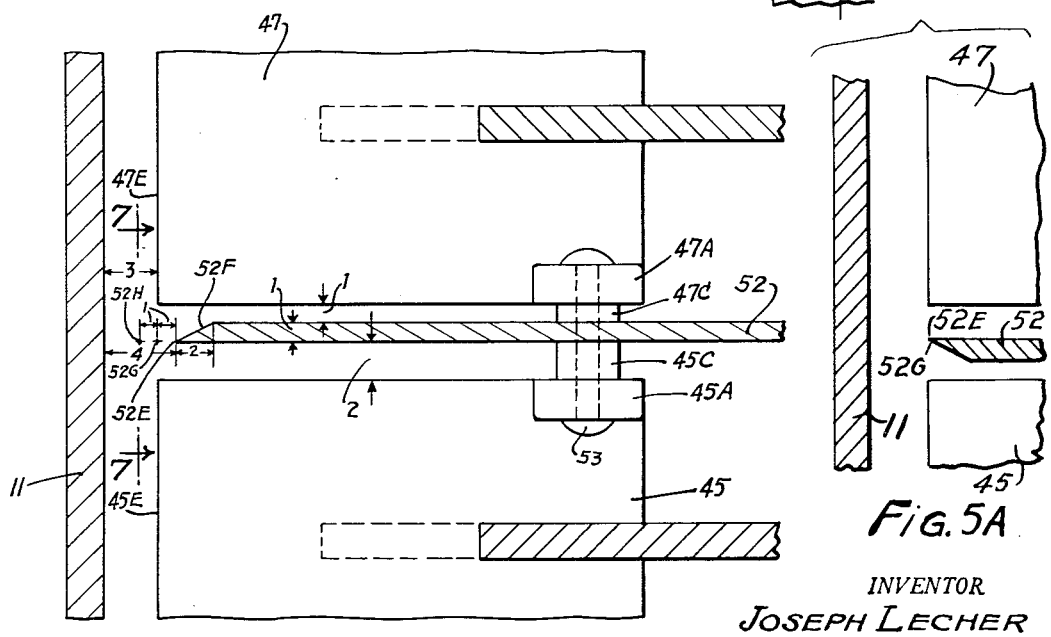
FIG.5
FIG.5A
INVENTOR
JOSEPH LECHER
BY
Paul, Paul & Moore
ATTORNEYS

INVENTOR
JOSEPH LECHER
BY
ATTORNEYS

June 26, 1956  J. LECHER  2,752,097
METHOD AND APPARATUS FOR THE PRODUCTION
OF FINE AND ULTRAFINE PARTICLES
Filed Aug. 17, 1951  6 Sheets-Sheet 5
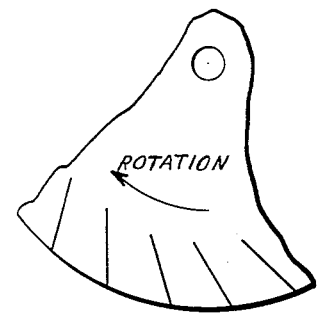
FIG.19
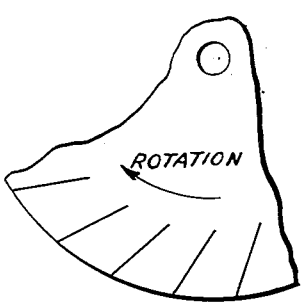
FIG.18
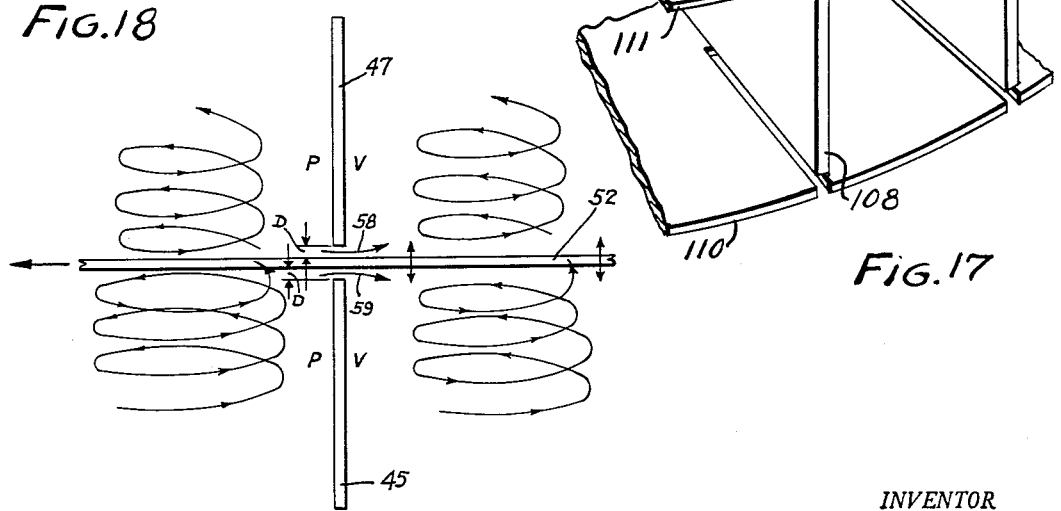
INVENTOR
JOSEPH LECHER
BY
Paul, Paul & Moore
ATTORNEYS

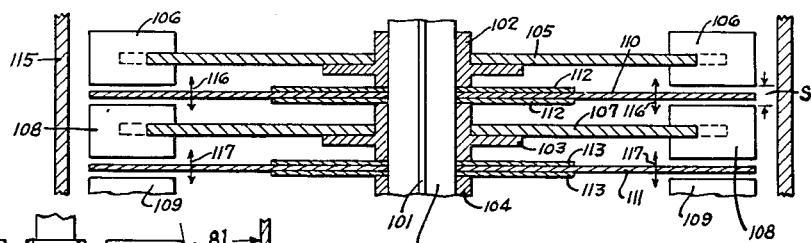
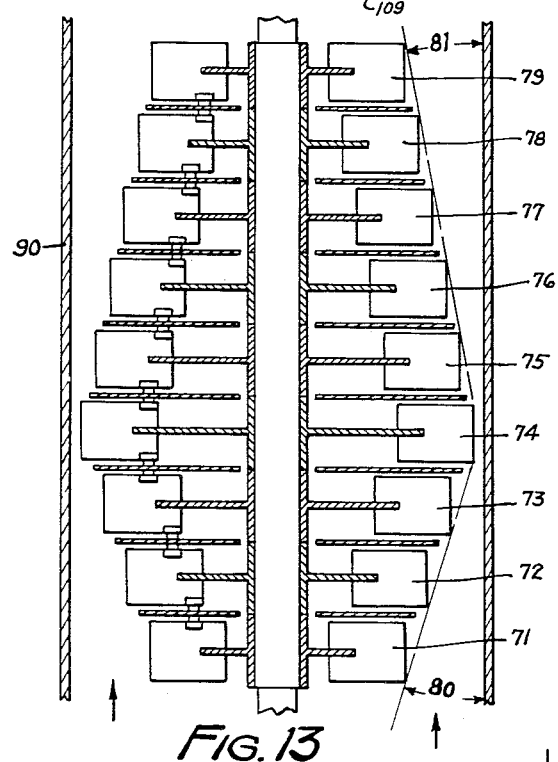
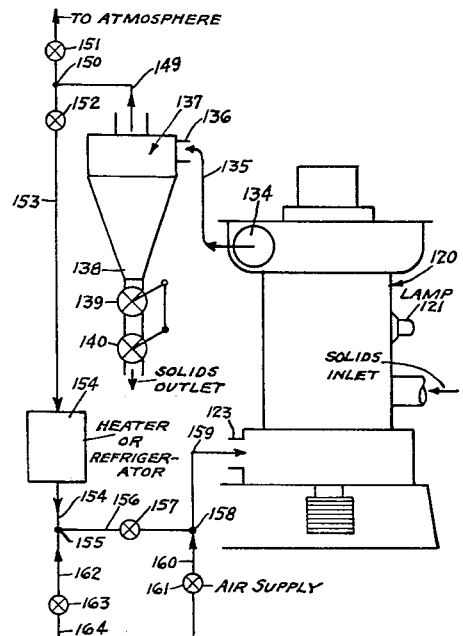

United States Patent Office 2,752,097
Patented June 26, 1956

---

2,752,097

METHOD AND APPARATUS FOR THE PRODUCTION OF FINE AND ULTRAFINE PARTICLES

Joseph Lecher, Basel, Switzerland, assignor to The Microcyclomat Co., Minneapolis, Minn., a corporation of Delaware Application August 17, 1951, Serial No. 242,390

23 Claims. (Cl. 241—17)

This invention relates to method and apparatus for processing materials and more particularly to the pulverizing of materials in a dry condition and while such materials are carried by a flow of gaseous fluid. In the dry pulverizing of materials utilizing methods and apparatus heretofore known, it has been possible to produce particles of a size of 10 microns. With some types of materials and machines it is even possible to produce materials in which a majority of the resultant particles are below 5 microns and wherein the major fraction below 5 microns has an average particle size as low as 3 microns.

However, utilizing known methods and apparatus for pulverizing, it has been practically impossible economically to reduce materials to less than 3 micron size on an average. When the material is reduced to, for example, three micron size, the mass of the individual particles is exceedingly small and the particles behave differently than the same material does when it has a larger particle size. Thus, most materials when reduced to a fineness size of 3–5 microns exhibit at this size range a change in the chemical, magnetic and electrostatic behaviors, and a change in ignition temperature, capillarity, susceptibility to infiltration of moisture and changes in flow as a fluid, as well as changes in surface activity and changes in apparent chemical properties. For practical purposes it has heretofore not been possible reliably to produce on a commercial scale in the same machine pulverized materials of any kind where the particle size is of much less than 10 microns. This, of course, varies somewhat, depending upon the materials, but generally speaking 10 microns has been the usual lower commercial limit, and 5 micron materials are regarded as exceptional. Dry pulverized materials of 3 micron size are exceedingly difficult to produce.

For the purpose of nomenclature in respect to the instant invention, the term "ultra-fine" will be understood to designate materials of less than 10 microns average particle size, and "fine" will be used to designate materials ranging from about the minimum particle size that can be sieved (i. e. about 50 microns) down to 10 microns.

It is an object of the instant invention to provide improved methods and apparatus for the production of ultra-fine particles.

Other and further objects of the invention are those inherent in the methods and apparatus herein illustrated, described and claimed.

The invention is illustrated with reference to the drawings in which

Figure 2 is an enlarged fragmentary vertical sectional view of a portion of the apparatus shown in Figure 1 and illustrating in greater detail the apparatus of the invention;

Figure 1:
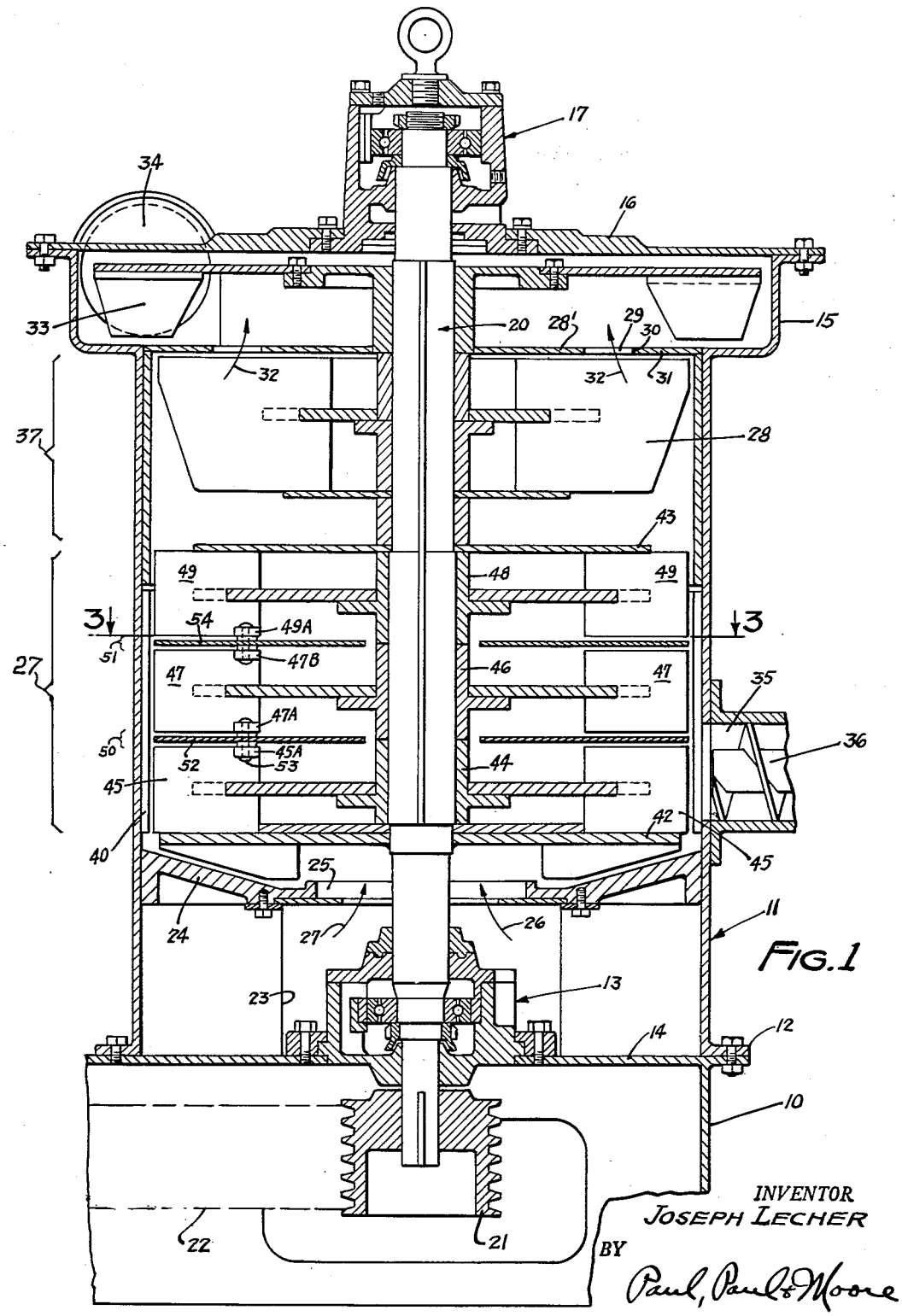
Figure 1 is a vertical sectional view of an exemplary apparatus of the instant invention which may be utilized for carrying out the process of the invention.
Figure 6:
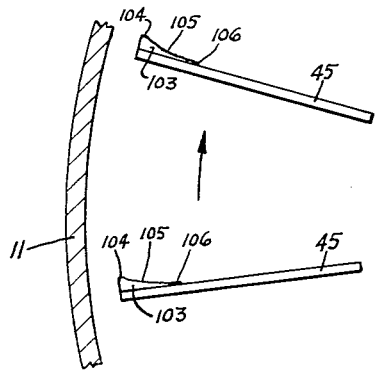
Figure 7:
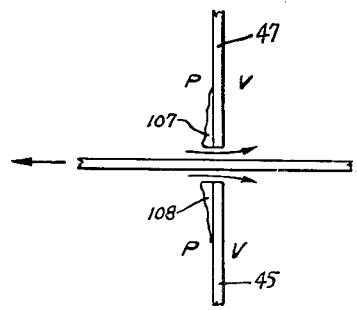
Figure 8:
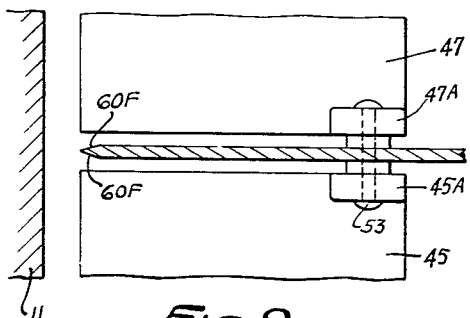
Figure 9:
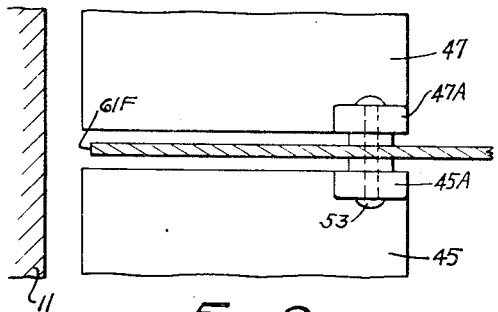
Figure 10:
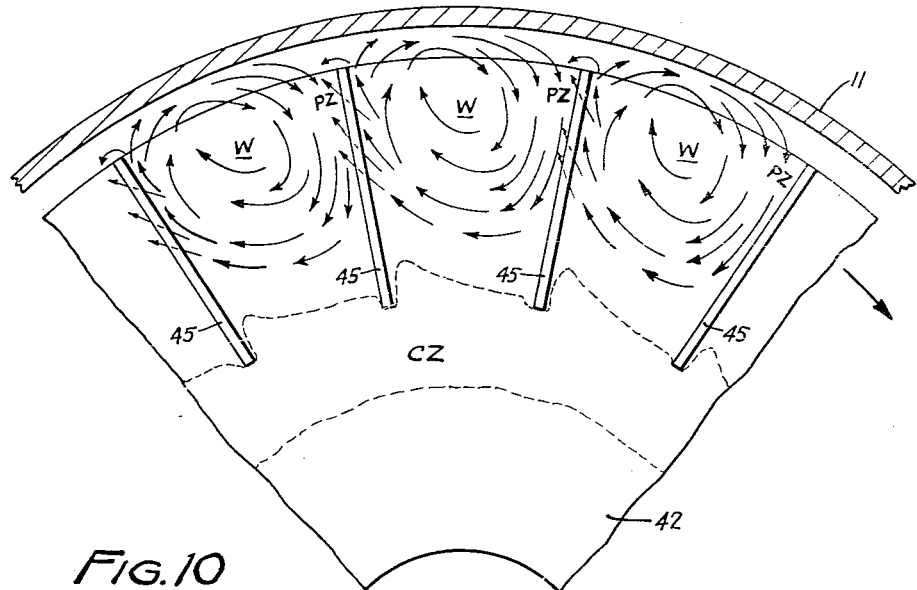

Figure 3 is a horizontal sectional view of the apparatus of Figures 1 and 2 taken along the line and in the direction of arrows 3—3 of Figures 1 and 2;

Figure 4 is a fragmentary vertical sectional view on the same scale and corresponding to that shown in Figure 2, but illustrating a slightly modified form of vibratory annular disk in such apparatus;

Figure 5 is a fragmentary sectional view greatly enlarged showing portions of the radial blade rotor and a slightly modified form of vibratory disk therebetween;

Figure 5A shows the disk 52 thus reversed;

Figure 6 is a fragmentary horizontal sectional view taken along the line and in the direction of arrows 6—6 of Figure 2;

Figure 7 is a fragmentary vertical sectional view of the apparatus shown in Figure 2 and taken in the direction of arrows and along the lines 7—7 of Figure 2;

Figures 8 and 9 are enlarged fragmentary vertical sectional views corresponding to that shown in Figure 5, except that each of Figures 8 and 9 show slightly modified forms of vibratory disk, with particular reference to the edge form of the disk;

Figure 10 is a fragmentary horizontal sectional view of a portion of the rotor, disk and casing, illustrating the flow pattern of gaseous fluid carrying the burden of material to be reduced, particularly the intra-blade vortex action with its outflow and inflow of gaseous fluid over the peripheral edge of the intrastage disk; and flow of gaseous fluid through the clearance between the blades and disks within the periphery of the rotor and disk;

Figure 11 is a fragmentary view showing several stages of the apparatus of the invention illustrating the vortex pattern of the gaseous fluid in the intra-blade zone with its burden of material to be reduced and between the stage-separating disks;

Figure 12 is a vertical sectional view corresponding to Figure 7 indicating the flow of gaseous fluid within the peripheral diameter of the rotor from the pressure side of the blade to the partial vacuum side which constitutes one of the several means for inducing ultrasonic vibrations in the disk;

It may be noted, with reference to Figures 10, 11 and 12 that these figures are explanatory and are not a limitation upon the invention. They merely represent one of the explanations available to me of the conditions existing in my machine and methods during operation.

Figure 13 is a vertical sectional view corresponding to Figure 1, except that it shows a slightly different form of casing and rotor shape for the apparatus of the invention;

Figure 14 is a fragmentary vertical sectional view of several stages of the apparatus of the invention and illustrating a modified form of radial blading tip shape;

Figure 15 is an enlarged fragmentary vertical sectional view through a modified form of rotor construction illustrating another form of apparatus and method within the purview of the invention;

Figure 16 is a schematic view showing a system of general application within the purview of the invention;

Figure 17 is a fragmentary isometric view generally corresponding to that shown in Figure 11, except that the vibratory disk is slotted adjacent the radial blades;

Figures 18 and 19 are fragmentary horizontal sectional views through the mill as a grinding stage, showing the radial blades tipped respectively in and against the direction of rotation.

In general, in carrying out the processing methods of the present invention there is utilized a gaseous fluid of dry character, such as air, inert or reactive gases, such as nitrogen, bromine, chlorine, hydrogen, oxygen, carbon dioxide, helium, etc., or dry or nearly dry steam or mixtures of such gases, or air and such gases, for carrying the particles of materials undergoing processing. The flow of dry or nearly dry fluid which can be heated or refrigerated for control of the reactions, and solid material carried thereby, is directed along a path so as to cause the particles to be brought repeatedly into contact with each other and/or into contact with abutting surfaces whereby the particles are caused to collide and to be subjected to impact with consequent attrition, shock and fracture. Simultaneously, while the particles are still subjected to such forces, they are subjected to intense sonic energy which is generated in the gaseous medium. The term "intense sonic energy," in this invention is intended to include a sound energy at levels, which at least at some frequencies, is in excess of 120 decibels and preferably in excess of 140 decibels, and in which the frequency of such sound energy ranges from the low audible frequencies through and including ultrasonic frequencies. By the term "ultrasonic" as used herein, there is intended to denote frequencies of about 18,000 cycles per second or higher, which are not commonly able to be heard by the human ear. By the term "intense sonic energy" as included herein, there is intended to be included sound energy having an energy level of 120 decibels or greater, as compared with a datum of 0.000204 dynes per cm.$^2$, at least at some frequencies in the frequency band ranging from the low audible frequencies of several hundred cycles per second through the high audible and well into the range of ultrasonic frequencies such as up to 50 kilocycles or even higher, and in which there may be present subsonic shock waves, both simple, intersecting and reflected, as well as the phenomena of air flow separation, which produces effects analogous to cavitations. The term "airflow separation" refers to and is intended to denote the conditions existing when rapidly moving air separates due to its inability to follow a surface and in which a condition of intense turbulence and vortexes exists.

One of the simples forms of practical apparatus for simultaneously subjecting the particles to the shock of mechanical attrition and/or impact and to such intense sonic energy is to include within the reaction zone (wherein the particles are preliminarily reduced in size or through which they are passed) vanes or leaves of resilient material mounted so as, at least partially, to define a passageway and/or clearance space or spaces through which the gaseous fluid and material carried thereby passes, said vanes or leaves being supported so as to be capable of being vibrated at a resonant or forced frequency by the flow of said gaseous fluid which moves through such passageways and/or clearance spaces of the treating zone. The vanes or leaves, which may be denoted vibrating member or members, are directly exposed to the solids and to the gaseous flow, in which intense sonic energy is thereby generated. Thus, the same gaseous fluid that is utilized for carrying a solid material which is to be pulverized, blended, coated, separated or otherwise treated may, according to my invention, be utilized, at least in part, to supply the energy to generate the intense sonic energy having the characteristics aforestated and for producing the side phenomena of subsonic shock waves and/or air flow separation and to transmit such intense sonic energy to the gaseous fluid and either through it or directly to the solid material carried by such gaseous flow.

As an illustration of one form of apparatus in which the method of the invention may be carried out economically and conveniently reference is made to the drawings, particularly Figure 1. In this figure there is illustrated a mill for ultra-fine pulverization of solids and is one form of apparatus of the invention. The mill has a sub-base 10 upon which there is mounted a cylindrical housing generally designated 11 having a lower flange 12 by means of which the housing is firmly attached to the sub-base. The cylindrical housing is provided with a strong lower bearing structure 13 on its lower enclosure wall 14. At the upper portion of the housing there is provided an annular enlarged chamber 15 which is covered by means of a cap 16 that serves as a support for the central upper bearing structure generally designated 17. The details of the bearings 13 and 17 are within the province of mechanical design and need not be described with particularity, except to say that they are adequate to support the shaft generally designated 20 and the rotor assembly carried thereby for rotation of the rotor at peripheral speeds of 25,000 feet per minute or more. Shaft 20 is provided at its lower extremity with a multiple V-belt pulley 21 upon which a plurality of belts run in tandem at 22 within the sub-base 10 and thus serve to rotate the shaft 20 at high speeds, as for example, 25,000 feet per minute peripheral speed, although it is not always necessary to utilize such speeds and lower speeds are utilized wherever possible so as to reduce stresses on the machine structure. The lower wall of casing 11 at the level of bearing 13 is provided with one or more openings 23 through which air or other gaseous fluid is adapted to flow. Within casing 11 and slightly above bearing 13 there is a diaphragm 24 having a central opening 25 which can be adjusted in size by plate 25' through which gaseous fluid may flow into the mill proper, as indicated by the arrows 25. The amount of gaseous fluid inflowing can, if desired, be regulated by means of a damper, not shown, so as to allow full flow or reduced flow. Above the diaphragm 24 there is a rotor structure shown opposite the bracket 27 in Figure 1, to which reference will hereinafter be made, and above the rotor structure at the level of bracket 37 in Figure 1, there may, if desired, be provided a multiple radial blade fan 28 which serves as a classifier for the material produced in the mill. The fan 28 is capped by means of a disk at 28' which has a diameter such that it presents an annular opening 29 or weir within the opening 30 of the ring 31. The finely pulverized material produced in the mill moves out of this annular weir in the direction of arrows 32—32 and are thence propelled by means of the multiple radial blade fan 33 and forced out of the outlet 34 of the upper casing 15. It may be noted that all of the rotary portions of the apparatus are carried on the one shaft 20 and rotated at the same R. P. M. The peripheral speed of the different parts of the rotor assembly does vary in accordance with the different diameters of the individual rotated parts carried by the rotor. If desired, the air or gaseous fluid flow through the mill may be accomplished by a separate blower system. Likewise, if desired, the inlet 25 can be connected to the outlet 34 by means of an external gaseous fluid circuit containing a cyclone separator, baghouse or the like for removing the solid components and thus reconditioning the gaseous fluid for recirculation. This is especially desirable where the composition or temperature of the gaseous flow is desired to be controlled, as in treating highly explosive or heat sensitive materials. Thus, in such a closed circuit system an atmosphere of especially constituted reactive, rare or non-reactive gaseous fluid can be established and by suitable heating or refrigeration of such atmosphere (which may be held at any desired absolute pressure) the reaction conditions can be controlled with precision. Also, additions or extractions of moisture from the product may easily be controlled by establishing the vapor pressure in the inflowing gaseous fluid.

Into the side wall of the casing 11, slightly above the diaphragm 24 there is an aperture 35 in which there is mounted a rotary screw 36 or any other feeding device adapted to the nature of the solid material undergoing processing, serving to feed such material directly into the casing 11. In many instances, as where the material undergoing processing is already divided in fine particles capable of being carried by a gaseous fluid stream, the solid feed via screw 36 or other solid feeding means may be dispensed with and the fine particles introduced with the gaseous flow entering at 26—26 through port 25.

The casing 11, throughout its portion above the diaphragm 24 and below the classification zone 37, is usually provided with an inner liner 40 which may be longitudinally fluted, as illustrated. The flutes may have a depth and width which depends upon the size of the mill, such as a depth and width of 1 to 100 millimeters and can be shaped like saw teeth or rounded. The liner can be made of a variety of materials, such as stellite, molybdenum steel, bort crystals, porcelain, rubber or the like adapted to the nature of the material to be processed and the effect desired. If it is desired to eliminate the shattering effect of impact, a liner such as rubber may be used when rounding or smoothing of the particles is desired. Thus, metallic or hard material particles, such as quartz crystals can be produced in smoothly rounded form in a machine using soft materials as a liner. On the other hand, when a maximum shattering effect and cleavage is desired, hard surface materials are used as liners. Also a machine may have a combination of materials such as a hard liner in the primary stages to effect initially maximum shattering and size reduction and soft liners in the finishing stages for polishing and rounding of the particles, or several machines with different liners may be used in series. Hard surface coating materials can be applied by electro-deposition procedures, or may be applied by welding them on by means of special "hard surfacing" welding rods, depending upon the type of hard surface coating being applied, whereas soft liners, such as rubber, can usually best be applied by vulcanization.

Referring now to section 27 in which the ultra-fine pulverization takes place in the mill, in the form illustrated this section is composed of three stages of radial blading disposed in vertically spaced relation between a lower annular plate 42 and an upper annular plate 43. Two or more such stages may be used, three being here illustrated for convenience in drawing. In general the three stages are similarly constructed and a description of one stage will suffice for all. Thus, the lower stage consists of a hub as at 44 having a plurality of radial blades 45—45 extending radially therearound. The hub 44 has a large number of such radial blades, there being 24 such radial blades here illustrated for a rotor having an external diameter of 18 inches. A greater or lesser number of radial blades may be used as desired, and the rotor diameter may likewise be varied, depending upon the size of the machine and upon the intensity of the work to be done. The radial blades 45 are preferably set directly radial as here illustrated (see Figure 3), but may be tipped toward or away from the direction of rotation, as shown in Figures 18 and 19 if desired, or in a slight vertical angle. The second stage provides a similar hub 46 which is likewise provided with radial blades 47—47. In the third stage there is provided a hub 48 carrying the radial blades 49—49. The hubs 44, 46 and 48 are suitably spaced on the shaft 20 and are keyed so as to rotate with the shafts and are locked against axial displacement.

The radial blades 45, 47, 49 (Figure 1) and the corresponding radial blades of the other illustrated mills can be made of materials or mounted so as to be freely vibratory, as hereinafter explained.

The spacing of the stages is such that between the blades 45 and 47 there is provided a space as at 50 and between the blades 47 and 49 there is a similar space at 51. Within the space 50 there is mounted an annular ring 52 which is suitably supported at three or more points from the lugs 47A on blade 47 and 45A on blade 45, so as to be free for vibration. Thus, referring to Figures 3 and 5, three or more selected evenly spaced blades 45 are provided with lugs at 45A and an equal number of evenly spaced blades 47 situated above the blades 45 are likewise provided with lugs at 47A. Then the annular ring 52 is held in spaced relation to the lugs 45 and 47 by means of suitable spacing washers as illustrated and the whole assembly held together by a through bolt as at 53.

Likewise, in the space 51 there is similarly supported an annular disk at 54, this likewise being supported from lugs 47B on the blades 47 and from lugs 49A on the blades 49.

Referring particularly to Figures 2 and 5, attention is directed to the following: The position of the mounting lugs 45A—47A by means of which the annular disk 52 is mounted on the blades 45 and 47 is such that the inner radial dimension "RI" (see Figure 2) from the minimum radius of the annular disk 52 out to the mounting lug is preferably slightly greater than the radial dimension "RO" from the mounting lug to the outer diameter of the same disk 52. Thus, I prefer to mount the disk 52 at a point such that the radial dimension RI is to the radial dimension RO as 7 is to 5, that is to say the radial dimension RI would preferably be 7/5 of the radial dimension RO. However, experience has shown that this ratio may be varied considerably and satisfactory results have been obtained where the dimension RI was equal or approximately equal to the dimension RO.

Referring to Figure 5 particularly, the spacing washers at 45C and 47C have a thickness such that the blade, as illustrated in Figure 5 is positioned with its sharpened edge 52E, midway between the upper edge of the radial blade 45 and the lower edge of the radial blade 47 and the maximum diameter of the vibratory disk 52 is preferably such that the edge 52 is slightly set back from the edges 47E and 45E of the radial blades. In Figure 5 the blade 52 is illustrated as being chamfered at one edge 52F, but as shown in Figure 8 the blade 60 may be chamfered at two edges 60F—60F, or, as shown in Figure 9, the blade 61 can, if desired, have a square edge as at 61F. I prefer, however, to use a vibratory disk 52, as shown in Figure 5 chamfered on one side only as at 52F. The vibratory disk 52 of Figure 5 may be set with the chamfer 52F either towards the blade 47 as shown in Figure 5, or towards blade 45, as shown in Figure 5A, as desired, it being understood that the washers 47C and 45C would in such instance be interchanged so as to maintain the edge 52E at the position shown.

It may be further noted that for best results the edge 52E should be as shown in Figure 5, but the diameter of the disk 52 may be changed so as to bring the edge 52E to or beyond the dimensions 47E as at points 52G or 52H.

The disks 52 and 54 (and the corresponding vibrating members of the other illustrated devices herein) are made of a thickness and has a modulus of elasticity such that when supported from the radial blades 45—47—49, as illustrated, and operated in the mill, the disks will vibrate intensely and produce intense sonic energy within the mill, especially in close proximity to the disks and radial vanes. Actual measurements of the sound intensity and frequencies were made at the inside surface of a mill casing 115 (Figure 15), in which the vibratory disks were mounted on the shaft 100 as in Figure 15 (but in which the supporting disks 112 and 113 were not used) and in which radial blades 106 were not mounted for vibration. Such measurements showed sound energy having an energy level in excess of 120 decibels at certain frequencies in a frequency range from the low audible frequencies to ultrasonic frequencies, are produced with greatest intensities in the range from about 4000 cycles per second upward. Sound pressure differentials (maximum peak to minimum peak of the sound waves) of .025 atmosphere were recorded on the inner wall. Sound energy level peaks of about 145 to 150 decibels occured at certain frequencies in the range of about 4000 cycles to 15,000 cycles per second, the measurements being taken on the inner wall of the stator.

The vibrations of the annular disks 52 and 54 (of Figure 1); the similar vibratory disks 54-1 and 54-2 (Figure 4); the disks of Figure 13; disks 110 and 111 of Figure 15 and disks 99—99 of Figure 14 are very complex and are produced by the movement of the radial vanes and vibratory disks relative to the various positions of flow of gaseous fluid through the mill. The rate of the gaseous fluid relative to at least some portions of the radial vanes and vibratory disks in the mill is believed to be in the subsonic range of 33,000 feet/minute to 55,000 feet/minute. The radial vanes and vibratory disks form passageways through which the gaseous fluid and its load of solid material being treated passes in moving through the reaction zone of the machine. Thus all of the flow must pass through the annular passageways formed by the disks 52, 54, etc., which are positioned normal to the inner surface of the casing 11—40, and the gaseous flow also continuously passes through the clearances between the radial vanes and the casing, and at least some of the flow passes between the radial vanes and the vibratory disks 52 and 54 (as spaces D—D, Fig. 12). The centrifugal forces of the mill throw the gases and solids radially outwardly and there is practically no flow up through the central portion of the mill (Figure 1), and none in the central portion of the mill (Figure 15).

The velocity of the gaseous fluid over the edges of the vibratory disks 52, 54, etc., and adjacent surfaces of the radial vanes is made up of various velocity components. Thus there is one component due simply to the rotation of the disks and radial vanes relative to the casing, and this component can be 25,000 feet/minute or more when using regular steel for the rotary mill-parts. The second component, namely the axial component of flow through the passageways between the vibratory disks 52, 54, etc., and the casing wall, can easily be 10,000 feet/minute with normal volumes of gaseous fluid flow through the mill. A third component is due to the instantaneous velocity of the vibrating disks in a direction normal to the disks. Such instantaneous velocities (assuming a frequency of 10,000 cycles/second and an amplitude of a fraction of an inch) may be as much as 5000 to 10,000 feet/minute (instantaneous). A fourth component of velocity is due to the movement of air from pressure to vacuum zones within the reacting space, as from zone P to zone V of Figure 12. Available evidence indicates that at least at some times, and at least at some places in the reaction space of the mill, the resultant velocities of gaseous fluid relative the adjacent surfaces (and possibly also relative the solid materials carried by the gases) are values which are well within the subsonic range of 33,000 feet/minute to 55,000 feet/minute. It is known that velocities of gases over surfaces presenting irregularities (such as the edges of the radial vanes and the edges of the vibratory disks and corrugations, alveole, etc., on the inside of the casing) produce subsonic shock waves. In the mill the subsonic shock waves are reflected and intersected.

In addition, there are zones of air separation at PZ and CZ, Figure 10, in which intense turbulence and local vortexes take place, which add to the intense sonic energy effects.

Thus, referring particularly to Figures 10, 11 and 12, the rotation of the radial blades 45, for example, within the casing 11 produces tight spirals (intra-blade vortexes) of the gaseous fluid and its burden of solid material between the blades as shown at W. It will be remembered that the overall average flow of gaseous fluid through the mill is in an axial direction (upward in the particular mill illustrated) and hence the gaseous fluid spirals tightly upwardly until it intersects and crosses the edge of the vibratory disk (52 or 54) between the stages.

The impingement of this spiraling flow of gaseous fluid across and then against the edges of disks 52 and 54 sets them into vibration and at the same time produces intense vibrations in the gaseous fluid and in addition is believed to produce subsonic shock waves emanating from the edges of disks 52—54. The solid particles are pushed by centrifugal forces through these zones of intense sonic energy and through or against shock waves that are set up. Shock waves also believed to be set up along some or all of the outer edge portions of the radial vanes 45—47, these waves being propagated outwardly from the vanes and at an angle to the shock waves produced at the edge of the vibratory disks. Impingement of such shock waves from the vanes upon the closely adjacent casing wall 11, which may be longitudinally fluted as illustrated at 40, produces reflection of the shock waves and crossing and intersections with the shock waves produced by the vibrating disks. In addition, available evidence indicates the presence of zones of air separation within the mill, such as zones PZ adjacent one face and near the tip of each radial blade, and most probably another annular zone CZ extending around at the rear ends of the several radial blades (see Figure 10). Where the radial vanes are constructed so as to vibrate or having resilient edges or blades carried and are used alone or in conjunction with the vibrating disks in the mill, such vibratory elements are likewise set into vibration and contribute to the total of intense sonic energy within the mill.

Figure 12 illustrates one probable cause of intense vibration of the disks 52 and 54 which produces one velocity component of the gaseous fluid, as previously explained. The radial blades 45 and 47 are in this illustration situated above each other and the disk 52 is located between them, being spaced therefrom by the dimension D—D and hence free to vibrate. The blades 45 and 47 move horizontally and one side P develops a pressure, whereas the other side V develops a lesser pressure or vacuum, since the movement is always in the same direction. Calculations indicate that there may be several atmospheres difference in pressure between zones P and V. Accordingly, some of the gaseous fluid flows through the space D—D as indicated by arrows 58 and 59. Assuming an initial differential movement of the disk 52, then as the vibratory disk 52 moves, for example, upwardly toward the blade 47 there is a tendency to pinch off the space D and accordingly the air flow 58 is decreased, thereby tending to increase the pressure P and decrease the vacuum V adjacent radial blade 47. At the same time the space between the blade 43 and vibratory disk 52 increases, thus allowing a greater flow at 59, accordingly decreasing the pressure P and reducing the vacuum V adjacent radial blade 45. This causes greater pressure to be provided to the upper surface of the vibratory disk 52 and it tends therefore to be forced downwardly in the direction of the blade 45, and as it overshoots the reverse effect is produced, thus tending to produce sustained vibration. Accordingly, the disks 52 and 54 are maintained in a state of sustained intense vibration which most likely includes fundamental and numerous harmonic frequencies. Where the radial blades 45, 47, 49, etc., are made of resilient material or have resilient edges, these are also set into intense vibration.

As noted, the average flow of fluid through the mill is upward in the illustrated form shown and, as shown by arrow 55 of Figure 11, and accordingly the whirlpools W of gaseous fluid are in the form of tight rising spirals or vortexes which at a certain level impinge upon the edge of the disk 52, as shown by the point 56 of the spiral S and between the blades 47—47 the similar whirlpool W' is likewise a rising whirlpool which at a certain level impinges upon the edge of disk 54, as shown by the head of arrow 57 in Figure 11. It has been demonstrated that the flow of the gaseous fluid in the vortexes as well as the gaseous flow radially inward and outward over the edges of the disk and over the edges of the vibratory blades is at velocities in the subsonic range and possibly higher, and the disks 52 and 54 are accordingly set into vibration, which may be at the natural frequency or a forced vibration, the true rate of vibration being not determined at this time. It is, however, known that an intense vibration of the disks 52 and 54 does occur, as well as of every radial blade made of resilient material so as to be capable of vibration or equipped with a resilient vibratory edge. Variations of pressure, temperature and humidity of the gaseous flow has some effect upon the overall performance and may be adjusted as desired. Normal humidity and air pressure suffices for most grinding and treating operations.

Plausible theory and available data support the view that a wide range of frequencies is included in the intense sonic energy established in the gaseous fluid and that such frequencies range from the order and magnitude of a few hundred cycles per second to high in the supersonic (super audible) frequency range. Frequencies as high as several hundred thousand cycles per second are believed to be produced, possibly as harmonics. All of these frequencies may not persist over wide areas in the reaction zone of the apparatus, and it is likely that the higher frequencies (probably harmonics) are local and may not persist in appreciable sound energy levels even to the casing wall 11—40, but are believed to be highly effective in their own localities.

As shown in Figures 11 and 12 there are clearance spaces or passageways, D—D, between the edges of the radial blades 45—45 and the inter-blade vibratory disk 52 and said disk and the next stage of radial blades 47—47. The vibratory disk 52 vibrates intensely and in this clearance region D—D the sonic energy is at an incredibly high level. The already shocked and preliminarily broken solid particles are carried by the vortexes of gaseous fluid and are drifted or forced through or at least near such clearance spaces D—D and such particles are subjected to the intensely concentrated sonic energy. It is believed that such action is at least partially responsible for the extraordinary size reductions made possible by the present invention.

Relatively small peripheral clearances or passageways are likewise provided between the outer edges of the vanes and vibratory disks and the inner surface of the adjacent wall 11—40 of the machine, as illustrated in Figures 1, 2, 4, 5, 6, 8 through 10, 14, 15 and for stage 74 in Figure 13 and in such peripheral clearance spaces or passageways, intense sound energy is generated, including the destructive effect of shock waves present in such regions as previously referred to. This intense sonic energy is accordingly imposed upon the solid particles undergoing treatment which must pass through such clearance spaces or passageways in being processed through the mill.

The foregoing explanation is submitted without limitation upon the invention as being the best explanation presently available. Whatever may be the reason, it is known that when the particles are subjected to shock and simultaneously or nearly simultaneously subjected to intense sonic energy, that the particles do disintegrate into much finer particles than it has been possible to produce in continuous operation by any prior methods or apparatus. Thus, by utilizing the apparatus and method of the instant invention it is possible, for example, to produce pulverized quartz wherein 90% of the product falls below a size of 5 microns and only 10% is above 5 microns and wherein the average particle size of the 90% fraction was 1 micron or less. Furthermore, the particles of said 90% fraction had a greater regularity of size and a more uniform configuration. Remarkable fineness of grind may be produced in cereals, pharmaceuticals, dyes, mixtures of dyes and fillers, of various cereals and dietary supplements; coatings of particles with plastics or dye; separation of ore values from gangue; and the widest variety of operations may be conducted.

Only three support points are illustrated for each disk 52 and 54, but it will be understood that more may be used or the disk may be supported at its center opening on shaft 20, as shown in Figure 15, and only the outer edge 52E left free to vibrate up and down.

Referring to Figure 4 the illustrated apparatus is of the same form as that previously described, except that instead of a single vibratory disk 52 and another single vibratory disk at 54, two disks 52–1 and 52–2 are in this form disposed in spaced relationship between the lower stages, a spacing collar at 60 being provided so as to maintain the disks spaced. Likewise, instead of one disk at 34, two spaced disks 54–1 and 54–2 are provided in spaced relationship between the upper stages and held thus by means of the spacing collar 61. The apparatus is otherwise the same and in this instance the pairs of disks 52–1 and 52–2 and 54–1 and 54–2 are likewise set into vibration by the flow of gaseous fluid through the machine and impose upon the material being pulverized intense sonic energy, the particles undergoing reduction are shocked by interparticle collision or by a collision of the particles with other portions of the machine. Whether or not the reduction in particle size is due to an actual contact of the particles with the vibratory disks of this figure (or disks 52 and 54 of the machine previously described) is not known. It is believed that the intense sonic energy of the vibrating disk is transmitted into the flow of gaseous fluid and that it is not even necessary that the shocked particles be brought actually into contact with the disk or disks, or that the particles are passed through or against shock waves or through the zones of air separation, but whatever the reason may be, the fact is that greatly improved results and finer particle sizes are obtained by the present invention, as well as more regular particle sizes and that 100% sterilization from mold, bacterial and other pest infection is obtained in cereal, flour, edible products, etc., that are made in the machines of this invention.

In Figure 13 there is illustrated another form of the invention wherein the successive stages 70, 71—79 of the mill are each made similar in pattern to the individual stages shown in the machines previously described, except that in Figure 13 the successive stages have diameters such that a reversed "Venturi form" or "Laval form" is produced. Thus, the stages 71, 72, 73 and 74 are successively increased in diameter with a maximum diameter at stage 74 and from stage 74 through stage 79 the diameter again decreases through successive stages but at a different rate as compared with the increase between stages 71 and 74. The angle 80, as indicated in Figure 12 should be in the range of 14–28 degrees, the angle 81 being approximately one-half as great as the angle 80. The casing 90 (within which the rotor turns) is of uniform internal diameter. Between each of the stages 71—72, 72—73 etc. there is provided a disk mounted for vibration as previously described. In this instance, however, the material, elastic modulus and thickness of disks at successive stages is varied so that each disk, regardless of its diameter, is capable of such intense vibration as stated, under the conditions in which it operates. Each stage is composed as previously described, of a plurality of radial vanes and produces a spiral of flow of gradually decreasing radius between stage 71 and stage 74 and from stage 74 through stage 79. Velocities of gaseous fluid flow in the subsonic and possibly the transonic ranges, relative to adjacent surfaces, occur at or slightly above stage 74 with intense impingement of the flow of gaseous fluid against the edges of the interspersed disks with the effects previously described. In the form of mill shown in Figure 13 the greatest reduction in size of the particles undergoing reduction appears to take place in stages 75, 76, and 77, as nearly as can be determined.

In Figure 14 a slightly modified form of the apparatus of the invention is illustrated, the same being identical with that previously described with reference to Figures 1–11, except that the tips of the radial blades are in this instance cut in the form of a Venturi or Laval-tube pattern half section. Thus, the blade 92 has a portion of its width decreased at 93 which is cut at an angle 94 of approximately 14–28 degrees. The blade also has a part of maximum diameter at 95 and then a less abruptly sloping portion 96 which has an angle 97 approximately one-half of the angle 94. The result is that each blade produces along the portion 93 a whirlpool spiral of air or other gaseous fluid of gradually decreasing radius and then at the portion 96 the air is moving at subsonic or transonic velocities with the result that impingement on the edge 98 of the vibratory disk 99 is much increased. The same action occurs for the successively higher stages shown in Figure 13. In Figures 13 and 14, as with references to Figure 1, the average flow through the mill is from the bottom to the top.

While my invention applies particularly to process and apparatus for pulverization, as previously described, other aspects of the invention include new methods of blending, mixing, separating, coating, sterilizing and chemically processing the widest variety of solid materials separately or simultaneously. Thus, by utilizing the method and apparatus of my invention two or more solid materials of any kind and of any molecular structure can be processed simultaneously in the machine and homogeneously mixed. Likewise, any solid materials, whatever their nature, may be mixed homogeneously and in any proportion and simultaneously reduced to an ultrafine powder economically and efficiently, meanwhile, in appropriate instances, being reacted.

The surface area of the ultrafine powders thus obtained is enormously increased as compared to the surface area of powders of larger particle size, such as 10 micron particles or larger and this makes possible the carrying out of various chemical reactions directly in the machine. Thus, the gaseous fluid used for carrying the solid material in the machine may in itself be a reactant gas, such as an oxidizing or reducing gas which combines with, precipitates or otherwise chemically affects the solid materials undergoing processing. Likewise, the temperature of the gaseous fluid and the solid materials can be regulated as they are fed into the machine, thereby to maintain suitable reacting temperatures directly within the machine and during the processing that takes place in the machine. Again, suitable solid or liquid catalysts and reactants for any reaction desired to be carried out may be added to the inflowing solid or gaseous materials along with wetting agents or other surface active compounds, and these are homogeneously mixed and incorporated with the ultrafine powders directly as they are produced within the machine and the ensuing reactions completed, either wholly or partly within the machine. Accordingly, the instant invention is not confined alone to the production of ultrafine powders but also to the production of mechanical mixtures of ultrafine powders with the simultaneous carrying out of reactions and in addition to separation of the particles produced. For example, sugar together with solid surface acting compounds may be fed into the machine simultaneously and each particle of sugar thus produced is intimately mixed (or adhered to or coated with) an appropriate percentage of surface active compounds. Similarly, solid or liquid catalysts introduced into the machine alone with a solid or liquid reactant are distributed over the reactant materials while all of the materials are reduced to ultrafine powder, thus enormously speeding otherwise slow reactions. The greatly increased surface area of the solids undergoing treatment, which is achieved by reduction of particle size, and "freshness" of the surfaces probably account for decreased reaction times for reactions carried out according to this invention and account too for the new ability of carrying out reactions in solid phase, not hitherto believed possible.

According to previous description herein the apparatus has an inlet for gaseous fluid (air or others) with control of the quantity, composition, temperature and pressure of gaseous fluid taken in. The material can be processed in the machine with a quantity of gaseous fluid, such as air, many times greater than the weight of the solid substance exposed to the gas and thus the effect obtained is proportionally increased, and the balance of the reaction shifted in the desired direction. Thus, shavings of white pine wood processed according to this invention are not only pulverized to very fine woodflour, but at the same time the resinous substances in the wood are by simple exposure to an enormous quantity of air oxidized proportionately much more than where the same size reduction is accomplished in my machine in an inert atmosphere. Hence, oxidation can be furthered or minimized by utilizing an inert atmosphere. Also, oxidation effect can be offset by adding neutralizing elements to the air or by adding wetting agents or other coating chemicals material or gaseous fluid inflow.

Among other phenomena produced by the use of enormous quantities of air or gas in proportion to the quantity of material processed may be mentioned the de-odorization of many products. Wherever an unpleasant natural odor of a product is an obstacle to its use, processing according to my invention is the simplest and most economical way of overcoming such odor. When the new surfaces are opened and before they can come into contact with the surrounding atmosphere, they are, in their virgin state, processed and covered with gas or composition of gases as required to offset or to transform the undesirable odor.

A reversal of this effect is also of advantage in many instances. Thus, when no fresh air or gas should come in contact with the new surfaces of the material or materials treated, a closed circuit system, as previously described, is used and the composition of gas in contact with the solid material is selected so as to be inert or relatively inert to reaction with the freshly exposed solid surfaces. This effect is obtained by simply recirculating the air or gas escaping at the outlet 34 to the gas inlet 25, whilst the particles in the outflow at 34 are collected in cyclones and/or in filters. This does not necessitate batch processing as the material fed in can be so arranged as to provide continuous inflow and the cyclone or filter collector can also continuously remove the finished material, while maintaining it out of contact with air.

Whilst the material will flow in constant process through such a closed circuit machine, the gas therein can be maintained in a condition of controlled volume, pressure, temperature and composition. If there should be an exchange of gaseous elements between the material processed and the gas being used as fluid energy carrier, appropriate chemical filtrage or reconstitution of the gaseous fluid elements can be secured, either in or outside the machine.

Proper control of adiabatic effects can also be obtained in my process by such recycling and reconstitution and control of temperature, humidity in respect to pressure and speed of movement of the gaseous fluid.

Likewise, some amounts of liquid acid or base, such as sulfuric acid or phosphoric acid, or solution of ammonia, caustic soda, or soda ash, can be added to the solid or gaseous materials inflowing into the mill, or gaseous reactants such as HCl, $SO_2$, $SO_3$, $NH_3$, or vaporized liquid reactants may be used with the result that reactions of the solid and gaseous phases can be caused to take place directly within the mill. An example is pulverization and simultaneous hydrolysis reaction of cellulosic fibers (wood pulp etc.) with an acid (such as phosphoric) for conversion of cellulose to starch; hydrolysis of starch to sugar; caramelization of sugar or milk powder with heat or acid; treatment of phosphate containing fertilizer rock with acid (HCl) for solubilizing the phosphates therein and many other reactions.

As a further example, I have processed rock phosphate which had been previously crushed to the size of very coarse sand and pebbles up to a few centimeter diameter simultaneously with tobacco leaves and stems and also pure DDT or hexa-chloro-benzene and reducing the whole mixture in one operation to ultrafine particles, blending them to a homogeneous powder. It was noticed that the phosphate particles were not only carriers or fillers of the insecticidal elements, but had actual insecticidal effect themselves since the phosphate particles had themselves absorbed ultrafine particles of the other (insecticidal) materials they were processed with, increasing thus the efficiency of the final product.

Since the tobacco plant was a special variety containing about 14% nicotin, the proportion of the processed mixture was 5% DDT, 15% tobacco and 80% rock phosphate, the result of which was a fertilizing insecticide more economically produced than ever before known and of higher efficiency than equivalent quantities produced and distributed separately would have been.

Similar combinations of fine grinding with simultaneous blending are of still greater importance in the field of the food industry, both for humans and for animals, as many tests and experiments have shown. Thus, there may be mentioned the simultaneous reduction of coca, sugar, milk powder and other ingredients into an ultrafine (below 10 micron) powder of very regular granulation and perfect homogenization. This process, due to the particularity of the design of the machines, eliminates the various operations of individual grinding of each material, it eliminates the blending process (which usually follows grinding) and it gives finer and better blended powders.

Many more experiences in this field have proven the usefulness of the processes and machines of the instant inventions and discoveries. In the field of cattle feed, there has been ground all together simultaneously oyster shells, meat flour, yeast, oats, barley, rock salt and other substances in proportions of 1/50 of 1% up to 50% and thus produced the most homogeneous feed-flour to be used as a livestock food concentrate or to be further processed into pellets or otherwise, or added to feeds. Tests have shown the considerably higher nutritive value of the products processed this way as against the same percentage of the same feed elements ground and mixed in the conventional mechanical way (hammer mill).

We have found that most solid materials begin to exhibit changes in physical and chemical properties, as well as magnetic and other properties when reduced to the size of about 10 microns with some materials and with others when reduced to about 3 micron particle size. It has been found that an unlimited number of physiochemical phenomena are obtainable by utilizing my invention. Electrostatic or electromagnetic separators may be utilized with the invention, either as a part of the processing machine or as separate units so as to provide separated fractions of higher degrees of purity or greater exactness than those hitherto produced by any known processes, for instance flotation.

Accordingly, while the instant invention is primarily directed to pulverization, other aspects of the invention include mixing, separating and chemical, electronic processing of materials.

In Figures 6 and 7 are shown edge formations which may optionally be used on the radial blades of any of the mills of this invention. In Figure 6 the edging 103 is built up by depositing hard surface material as by welding and the blade is incidentally provided with a forwardly curved surface 104—105—106. This contour contributes to good operation of the mill. In Figure 7 the hard surfacing material is shown carried along the lower edge 107 of blade 47 and at the upper edge 108 of blade 45. These surfacings are likewise slightly curved ahead at the blade edge. The inside of the mill casing can likewise be hard surfaced as desired.

Figure 15 illustrates a slightly modified form of the invention wherein the vibratory disk is mounted directly on the same shaft which carries the radial vanes. Thus, the shaft 100 is provided with a keyway 101 and on the shaft there are mounted a plurality of vanes, the vanes being carried in each instance by a central hub as at 102, 103 and 104. The hub 102 carries the disk 105 upon which the radial vanes 106 are mounted, the hub 103 carries the disk 107, upon which the radial vanes 108 are mounted, and the hub 104, which is only partially shown, similarly carries the radial vanes 109, of which only the upper fragments are shown in this view. Between the hubs 102 and 103 there is mounted the disk 110 and between the hubs 103 and 104 there is mounted the disk 111, these disks being apertured so as to have a loose sliding fit on the shaft 100 and provided with a keyway so as to fit the key 101. The disks 110 and 111 are preferably (but not necessarily) supported by one or more smaller disks at 112—112 on opposite sides of disk 110 and as shown at 113—113 on opposite sides of the disk 111. The shaft 101 is usually provided with a collar or nut at one position along its length and the hubs and disks are arranged on it in alternate relation and finally pulled down by a press fit collar or nut at a further position along the shaft. Thus, the whole entity rotates when the shaft 100 is rotated. The entity shown in Figure 15 includes only three stages, but it will be understood that a greater or lesser number of stages may be used and that these need not all be of the same diameter but may be arranged in accordance with the pattern shown in Figure 13 and the peripheral edges of the radial vanes 106, 108 and 109 may be cut to the pattern shown in Figure 14, likewise if desired. The entire rotary assembly shown in Figure 15 is then mounted in the usual casing 115. During operation the disks 110 and 111 which are of suitable elastic metal flex up and down about the central mounting as shown by the double arrows 116 for disk 110 and 117 for disk 111. The disks may be supported at their central portions by the subsidiary smaller elastic disks 112—112 for the vibrating disk 110 and 113—113 for the disk 111. The disk 110 and subsidiary disks 112—112 accordingly act as a leaf spring, the peripheries of the disk 110 thus vibrating up and down within the space S between the lower edges of the radial vanes 106 and upper edges of the radial vanes 108, the disks 112—112 (where used) being likewise flexed to a limited extent by such vibration. Disk 111 vibrates similarly. The advantage of this construction resides in its simplicity of manufacture. Intense vibrations of the disk are produced in precisely the same manner as previously explained with reference to the modification shown in Figures 1–14 and establish in the reaction zone within the mill the intense sonic energy phenomena hereinbefore mentioned.

In Figure 16 there is illustrated an exemplary form of system of the invention in which the mill is shown generally at 120. The outlet 134 of the mill is connected by a closed line 135 to the inlet 136 of a solid separator generally designated 137 which may be of the cyclone or baghouse type, electrostatic precipitator or the like. A solid material separator here illustrated is a cyclone separator. This separator has a solid material outlet at 138 provided with inter-linked valves 139 and 140 that are coupled so that the solid material may be removed periodically without liberating from the cyclone separator the gaseous fluid in the disintegrator system. The gaseous fluid which is separated from the solids in the separator 137 goes by way of a closed line 149 to a branch at 150, where, if desired, it may be exhausted through the valve 151 to atmosphere, where the gaseous fluid is not re-used, valve 152 in such case being closed. But where the gaseous fluid is re-used, valve 151 is closed and the fluid traverses through valve 152, which is then open, and through line 153 and (where desired) through a heat exchanger 154 which may be arranged either to heat or to extract heat, i. e. to cool, the gaseous fluid which being thereupon heated or cooled, as may be required for the particular processing of material undergoing treatment, then passes via line 154 to the junction 155 and thence through line 156 and valve 157 to junction 158 and thence through line 159 to the inlet 123 of the mill. At junction 158 there is an inlet at 160 through valve 161 from atmosphere. Where it is desired to use atmospheric air as the gaseous fluid, the gaseous fluid of the system is not usually recycled and valves 152 and 157 are then closed and valves 151 and 161 are open. Accordingly, air enters via the valve 161, which may be adjusted so as to decrease the amount of air passing through the system and the air after passing through the mill 120, wherein the work is done, then passes out of the outlet 134 and through the solid material separator 137, thence via line 149 through junction 150 and through valve 151 to atmosphere. Where it is desired to have a closed system for recirculating the gaseous fluid, valve 151 and valve 161 are closed and valves 152 and 157 are open and in such case the gaseous fluid is recirculated.

At junction 155 a line 162 enters through valve 163 which can be a pressure regulator valve or hand operated valve which is connected via line 164 to the outlet of a pump 165, the latter being driven either to maintain a pressure or vacuum in the entire system of the mill 120. Where vacuum is desired, pump 165 is reversed until the desired vacuum is drawn and then stopped. Of course, when pressure or vacuum is maintained in the system, this is provided by utilizing the closed system valve settings. By closing valve 161 and pinching off valve 151 a pressure can be maintained and some of the gaseous fluid may be recirculated, depending upon the setting of valve 152.

The inlet pipe 166 to the pump 165 may be connected through valve 167 to the atmosphere supply 168 or may be through the valve 169 and header 170 which is supplied by any one of a number of bottles 171 connected to the header 170 through appropriate valves. The bottles represent a special gas supply, as where it is desired that the atmosphere within the system be something other than air. Thus, nitrogen, helium, chlorine or other reactive or non-reactive gases or vaporizable liquids alone or in any special composition of gaseous fluids may thus be supplied to the system as desired, and once the system is charged the gaseous fluid is recirculated and only enough additional special composition gaseous fluid is introduced to make up losses.

The mill 120 also includes at 121 a special light capable of emitting into the interior of the mill light of wave lengths within or without the visible range, such as ultra-violet, infra-red, X-ray, visible or a combination of such light wave lengths.

Accordingly, in Figure 16 there is illustrated a versatile system wherein the solid material may be subjected to shock and additionally subjected to intense sonic energy phenomena while being carried in a gaseous fluid which may be either air or special atmosphere at pressures above or below atmospheric pressure and at temperatures above and below normal ambient temperatures. It will, of course, be appreciated that the work supplied by the mill has a tendency to increase the temperature of the gaseous fluid flowing therethrough. In addition to such normal temperature rise, added heat may be imposed upon the gaseous fluid within the system, or such heat may be extracted so as to maintain low temperature operating conditions. In addition, in such system the solid materials undergoing treatment may be subjected to reactions, in addition to solid-solid phase reactions, due to the special gaseous fluid atmosphere involved and meanwhile, if desired, subjected to light irradiations within or without the visible range. The system of Figure 16 is, therefore, one of versatile application and may be adjusted for carrying out a wide variety of specific treatments. Without limitation on other disclosures herein, it will be understood that in many applications a much simpler system corresponding to one of the valve settings of Figure 16 may be utilized. Thus, when air at atmospheric temperatures and pressures is used as the gaseous fluid, the mill is as shown in Figure 1.

If desired, radial or somewhat radial separations forming slots may be provided in the outer portion of the ultrasonic vibrator (disks), 52, 54, 110, 111, etc., thus providing radial segments somewhat like the petals of a flower, which are individually free to vibrate, as shown in Figure 17. A radial slotted construction is especially adapted for the Figure 15 construction. The slots can be directly in line with the adjacent edges of the radial vanes, and about the same length radially as the vanes, and the edges of the slots and adjacent vanes may, if desired, be chambered so as to provide maximum intense vibration producing effect in cooperation with the intense velocity of air moving over such edges. In some instances the slots may also be continued radially inwardly beyond the zone CZ. Radially slotted disks are most easily supported when mounted on the rotor as shown in Figure 15. Also, such disks, partially or completely radially slotted, may be mounted on the stator.

In a mill having a circumference at the inner liner of, for example, two meters and having flutes longitudinally of the liner wall ½ centimeter apart, presents to each of the radial blades (45—47—49 of Figure 1) 400 variations in clearance for each revolution of the rotor (with consequent sonic energy producing effect). For a rotor revolving at a speed of, for example, 50 revolutions per second (3000 R. P. M.), which is easily obtainable, a frequency of 20,000 cycles per second is produced, with sub-harmonics and higher harmonics according to the modulus of elasticity of the radial blade, their size, shape, thickness and the manner of its mounting on the hub of the rotor.

The energy produced by the vibratory disks (52, 54, etc.) or produced by vibratory radial blades (45—47—49, etc.) can, to some extent, be controlled by the volume of gas admitted, as well as by other means such as control of temperature and/or humidity. It has been noticed that when a smooth inner liner is used vibrations are produced in the disks 52, 54, etc., as well as in the vibratory radial blades 45, 47 and 49 where such are made of resilient material. Hence, vibrations of such disks and radial vanes are not dependent upon having a fluted inner liner within the mill. This phenomena is thought to be due to impingement of the gaseous fluid and/or particles upon the various elastic members and due to reflections of intense subsonic shock waves from the inner liner, regardless of the particular surface of the inner liner.

The very words "sonic" and "sound" as used in conjunction with the instant specification may be considered as something of misnomers since they connote a physical effect which may be heard. Yet the energy levels observed (by direct measurement on the inside surface of a mill made substantially like Figure 15) were of an order of magnitude 20 to 50 times greater than the maximum sound intensities that could be heard by the average human ear and well beyond the threshold of pain, and frequencies observed exceed the highest pitches capable of being heard by humans. Peak-to-peak pressure differentials in the gaseous medium of .025 atmosphere were observed, which are values so high that the human ear would be destroyed or deteriorated if exposed to them.

Hence, while the terms "sound" and "sonic" have been used herein, it will therefore be understood that such terms refer to vibrations in the gaseous medium like those, which at very much lower energy levels and appropriate frequencies, can be heard.

Tests do establish that the widest variety of solid materials may be reduced by the method and process herein described to finenesses of particle size heretofore unobtainable by any known commercial processes and with expenditures of power (KWH per pound of material produced) which are incredibly low as compared with known methods of producing even much coarser particles.

Each solid particle introduced into the mill is believed to be preliminarily shattered by simple mechanical impact and/or attrition due to collision with other particles or with the walls of the mill, the rotating vanes or vibrating disks. Such preliminary impact shatters or wears the material into smaller particles which are still much larger than ultimately produced, or at least subjects the substance of the particles to the internal intergranular, perhaps intermolecular vibration. The strains or internal vibration of the substance of the solid are believed to weaken the cohesive forces which ordinarily exist between adjacent grains, cells or molecules of the substance. Then while the still large particles are thus weakened and therefore the cohesive forces have been permitted to recover, and even simultaneously with the preliminary simple mechanical shattering or attrition, the particles are subjected to intense sonic energy effects hereinbefore described and defined including intense sound wave pressures and the effects of phenomena such as subsonic shock waves and/or the effects of air separation, akin to cavitation, as may be present. All said effects and phenomena are all probably present and effective in varying degrees in various portions of the reaction zone. The effect that each plays in the disintegration of the particles to ultimate fineness is not fully separately evaluated. The sheer intensity of the sonic energy in the reaction zone is believed to be the primary factor of effectiveness and that the factors of frequency, shock waves, and air separation, which are herein included in the definition "intense sonic energy," may contribute to the results. Evidence and reasonable theory indicate the existence of all three effects, the intensity of the sonic energy being established by measurements taken on the inner surface of the mill.

Many widely varying solid substances of organic and inorganic composition are capable of reduction to extremely fine particle size, as of being mixed, coated, decoated, or separated, when processed according to the processes and utilizing the apparatus of the invention. Thus cereals such as wheat, rye, rice, barley, oats, corn and the like may readily be reduced to produce whole grain flours of excellent quality for human and animal consumption. Whole wheat flour and whole rye flour each of exceptional value and good bread-making qualities may thus be produced. In general, flour produced according to my processes exhibits higher moisture absorption and requires less fat for the production of bread, cake, etc., than flour produced by usual methods. Furthermore, finely divided cereal products produced by utilizing the method and apparatus of the present invention exhibit freedom from infestation and freedom from development of rancidity much beyond those produced by ordinary milling processes. This is believed to be due to the fact that all insect life, eggs of insect and even microbe life is killed or vitiated when subjected to the intense sonic energy combined with shock and attrition, with the result that the products remain pure and wholesome, free from rancidity, and are capable of being stored for exceptionally long periods, if reasonably protected from reinfestation. Likewise, yeast may be rendered good tasting and free from objectional odors when processed utilizing the present invention. Yeast ground by the processes and apparatus of the invention is so finely divided that it may be used as an artificial pollen for bees.

Materials of soft or resilient nature, organic or inorganic, may be reduced to ultrafine particles by processing them while frozen. Yet many soft materials such as rubber automobile tire casings reinforced with cord of fabric, or the like, may be reduced to fine particles at normal temperatures and pressures. In addition separation of the rubber and fabric of such materials may be accomplished with ease by suitable adjustment of classifier 15. Therefore, it is not always necessary to freeze soft materials to pulverize them.

The valuable constituents of plant or animal life can be extracted by grinding dry in a gaseous fluid, the temperature of the gaseous fluid being adjusted to vaporize the desired constituent as the plant or animal material is reduced to fine or ultra-fine condition. Apparently the intense sonic energy produces high local temperatures, which assists in such vaporization but is not sustained long enough to cause harm to any organic product. The gaseous fluid with its burden of vaporized constituent or constituents may, after separation from the parent solid particles by any suitable solid-gas separator, then be chilled to condense such constituents as liquids or solids. Thus many desirable essential oils, pharmaceutical constituents and factors, etc., may be removed from their parent plant or animal substances without solvents. As an example the iodine of seaweed was removed by grinding the seaweed to ultrafine powder using this invention, the iodine being vaporized out of the ultrafine seaweed particles and carried away by the gaseous fluid. Similarly nicotine can be removed from tobacco. Where it is desirable not to remove the valuable constituent from the parent plant or animal substance in which it is found, or where it is desirable to leave it on the surface of the ultrafine particles or dispersed in between them, the temperature of the gaseous fluid is kept low, or adjusted so as not to vaporize the valued constituent.

Thus ultrafine particles of dry tobacco plant material containing the natural present nicotine may be made by grinding such material at suitably low temperatures. In this way it is possible to provide ultrafine tobacco powder containing its naturally present nicotine for pest control, thus obviating the necessity of wet extraction of nicotine and preparation of sprays or powders. Among other organic and inorganic substances which may be processed utilizing the present invention may be mentioned ores, such as iron ore, pyrite and taconite, fuels such as coal, lignite, non-metallic minerals such as sulphur, Glauber's salt, abrasive materials such as quartz, chert, flint, carborundum, materials such as gypsum, graphite, clay, noviculite, vermiculite, mineral dyes, organic dyes, pharmaceuticals, oil cake of all kinds, wool containing burrs, the burrs being reduced without harm to the wool, cereals and cereal components, wood in all forms, nuts, corncobs, peanut shells, seeds, grape and apple pomace, metals (for the production of metal powders), seed cake such as linseed, soybean, walnut and other cake residues from oil producing seed and nut materials.

Feed mixtures for livestock, hogs, chickens, etc. may be prepared and ground to fine powder by introducing the whole constituents in admixture into the mill, whereupon they are ground to ultrafine powder and mixed in one operation. Such feeds exhibit exceptional nutritive value beyond that of the same ingredients ground conventionally and mixed. Thus, two batches of chicken feed were prepared from oats, bran, wheat, oyster shells, salt, etc. according to standard formula. In one batch the ingredients were ground separately in a hammer mill and then mixed. In the other batch the ingredients in whole form were mixed roughly and then ground to an ultrafine powder and mixed using the processes and apparatus of this invention. Two batches of chicks (day old) were fed from the two batches respectively, other growing conditions being identical. After three weeks the chickens fed the feed produced in accordance with this invention were in better condition, larger and weighed about 15% more than those fed conventional feeds.

In the processing of many materials, particularly the biological, chemically unstable and photosensitive materials, the reactions may be directed or enhanced by lighting the interior of the reaction mills with light in the wave lengths within or without the visible zone, such as infra-red, ultra-violet, actinic light and X-rays. Thus, yeast products were processed using the apparatus of the invention with simultaneous or nearly simultaneous application of ultra-violet light. It was found that the vitamin contents were vastly increased. The light may be applied through the casing walls, through the inlet or outlet, or by mounting on the rotor itself, electrical power for such lights being supplied through slip rings on the rotor.

All decibel values given herein are with reference to a zero (datum) of .000204 dynes per cm.$^2$.

In general, it may be stated that the solid material is fed in such sizes as conveniently available. It is often most convenient to crush, cut or otherwise comminute the solid material to sieve sizes or even down to fairly small size particles (such as 50 microns) which can usually be done easily before treating the solid material according to the present invention.

This application is a continuation-in-part of my copending application Serial No. 213,720, filed March 3, 1951, and now abandoned.

As many apparently widely different embodiments of this invention may be made without departing from the spirit and scope thereof, it is to be understood that I do not limit myself to the specific embodiments herein.

What I claim is:

1. The method of disintegrating granules of solid material which comprises carrying said solid material in a dry gaseous fluid and subjecting said solid material to collision with solid surfaces sufficient to fracture said granules and simultaneously disintegrating the fractured granules by subjecting them to intense sonic energy at a level of at least about 120 decibels.

2. The method of processing solid material which comprises carrying granules of solid material in a flow of a gaseous fluid through a plurality of clearance spaces between edges of relatively movable surfaces, at least some of which are capable of vibration, moving said surfaces and edges relative to each other and moving the flow of gaseous fluid and solid materials borne thereby into collision with said surfaces to fracture the granules and through said spaces at a rate sufficiently high to vibrate said surfaces and establish in said gaseous fluid and to impose upon said solid material sonic energy having an intensity in excess of 120 decibels for disintegrating the solid material.

3. The method of claim 2 further characterized in that the gaseous fluid is inert in respect to the solid material.

4. The method of claim 2 further characterized in that the gaseous fluid is reactive with the solid material.

5. An apparatus for processing solid materials which comprises a casing, fan means for moving a flow of gaseous fluid through said casing, means for introducing the material to be processed and pulverized so as to be carried by said fluid flow, rotor means within said casing for moving said particles into collision for crushing said particles, and means within the casing and mounted on the rotor means for vibration relative thereto for simultaneously in cooperation with the rotor means and casing establishing in said gaseous fluid sonic energy of an intensity exceeding 120 decibels.

6. An apparatus for pulverizing solid materials comprising a casing, means for introducing a preliminarily granulated solid and a flow of gaseous fluid into said casing for movement therethrough, a rotor in said casing having a plurality of radial blades thereon, said blades extending generally axially in respect to said rotor and elastic disk means mounted intermediate said blades adjacent the ends thereof, said disk means being mounted for vibration relative to the rotor and the blades due to the flow of gaseous fluid across the disk edge as established by said blades.

7. An apparatus for pulverizing solid materials comprising a casing, a shaft journalled in the casing for rotation about the axis of the casing, a plurality of stages of blades mounted on said shaft for rotation therewith, each of said stages comprising a plurality of substantially radial blades, said stages being separated by a small space between the blades of one stage and the blades of the next succeeding stage, mountings on spaced blades of each stage and an annular ring of thin flexible material fastened to said mounting and positioned so that, except for said points of mounting, it is free of contact with the blades of the adjacent stages, the blades of the stages and the edges of said disks being in relatively close proximity to the casing wall, and means for moving a flow of gaseous fluid and preliminarily crushed solids in an average axial direction through the said casing.

8. The apparatus of claim 7 further characterized in that in the direction of average flow of fluid through said casing, the stages of blades have a diameter increasing from one minor diameter successively to a maximum diameter slightly less than the casing, and then decreasing through successive stages but at a less rapid rate, to another minor diameter, the overall contour of the multiple stage rotor being the converse of a Venturi section.

9. The apparatus of claim 7 further characterized in that the edges of the blades of each stage are shaped so that in the direction of average flow of fluid through the casing, the blade has an increasing radius to a maximum radius and then a decreasing radius, said decrease being at a less rapid rate than said increase, the blade edge thus having a contour corresponding to a Venturi half-section taken along the Venturi longitudinal center line.

10. The apparatus of claim 7 further characterized in that in the spaces between successive stages there are mounted a pair of annular rings spaced from each other and each supported for free vibration axially in respect to the casing.

11. An apparatus for pulverizing solid materials comprising a casing, fan means for moving a flow of gaseous fluid through said casing, means for introducing a flow of preliminarily granulated solid material into said flow of gaseous fluid for movement therewith through said casing, a rotor within the casing for moving said mixed flow of gaseous fluid and solid material into contact with the casing for reducing said particles in size by collision and attrition and means in the casing for simultaneously imparting to said particles intense sonic energy comprising a disk supported on the rotor in a plane generally transverse to the axis of the rotor, said disk being spaced from adjacent rotor parts so as to be free to vibrate and radially slotted.

12. An apparatus for pulverizing materials comprising a generally cylindrical casing means having an inlet and outlet disposed in spaced axial relation, means for moving a flow of gaseous fluid in an average axial direction through said casing, means for introducing solid material, the particle size of which is to be reduced, into said flow through said casing, relatively movable rotor and stator means within the casing between which moves the average flow of gaseous fluid and solid material being treated, at least one of said rotor and stator means including a disk of resilient material mounted substantially transverse to said flow for vibratory movement, and spaced so as to leave the edge of the disk free for vibration, said free edge being positioned so that said flow moves thereacross for vibrating said disk.

13. The apparatus of claim 12 further characterized in that said disk is mounted on the rotor for rotation therewith, the periphery of the disk being free to vibrate, said rotor including radial vanes above and below the disk having proximate edges spaced for vibration of the disk edge therebetween.

14. The apparatus of claim 12 further characterized in that said disk is mounted on the rotor for rotation therewith, the periphery of the disk being free to vibrate, said rotor including radial vanes above and below the disk having proximate edges spaced for vibration of the disk edge therebetween, said disk being slotted adjacent the proximate edges of said vanes.

15. An apparatus for pulverizing solid material comprising a cylindrical casing having a rotor journalled axially in respect to the casing for rotation therein, a plurality of stages of radial blades mounted on said rotor, said stages being separated in an axial direction, disks mounted on said rotor in said spaces between the blade stages, said disks being mounted for free vibration to and fro axially in respect to said rotor, said radial blades and disks having a diameter such that they move in close proximity to the walls of the casing, means for moving a flow of air and granular material to be pulverized in an average direction axially through said space between said blades and spacing.

16. A mill for pulverizing solid materials comprising a cylindrical casing, journals on the casing supporting a rotor for rotation therein in a position axially with respect to the casing, a plurality of stages of radial blading on said rotor, each stage comprising a plurality of generally radially extending blades having a radial dimension such that they move in close proximity to the casing walls, said stages being slightly separated, disk means mounted on the rotor between said blade stages for vibration in an axial direction in said space, the circumference of said disk being free to vibrate due to the flow of air thereacross through the clearance space between it and the casing, the circumference of said disk being closely adjacent the ends of the radial blades and the casing.

17. The apparatus of claim 16 further characterized in that said disc means has its center fixedly attached to said rotor, the marginal edges of said disc means being free to vibrate.

18. The apparatus of claim 16 further characterized in that the circumference of the disk is sharpened to a relatively fine edge.

19. The apparatus of claim 16 further characterized in that said disk is in the form of an annular ring and is supported from the rotor at spaced points intermediate its minimum and maximum radii, said disks otherwise being free to vibrate.

20. A mill for pulverizing solid materials comprising a casing of generally cylindrical shape having closed ends, bearings at opposite ends of the cylindrical casing and a rotor shaft mounted in said bearings for rotation about an axis which is common to the casing cylindrical axis, an annular passage in one end of the casing for inflow of gaseous fluid into the casing and an annular passage at the opposite end of the casing for outflow of said gaseous fluid, fan means mounted on said casing and rotated by said shaft for moving said gaseous fluid through the casing in an average direction axially therethrough, at least two stages of radial vanes in said casing, each stage being spaced axially on the rotor shaft from the other so as to present a space between said vanes, an annular ring mounted in such space, said ring being supported from the rotor so as to be free to vibrate at at least its maximum circumferences about the support of said annular ring, the circumference of said annular ring being closely adjacent the tips of the radial vanes of the rotor and both closely adjacent the inner wall of the cylindrical casing, and means for feeding solid material for movement with said gaseous fluid through said casing.

21. An apparatus for pulverizing materials comprising a generally cylindrical casing means having an inlet and outlet disposed in spaced axial relation, means for moving a flow of gaseous fluid in an average axial direction through said casing, means for introducing solid material, the particle size of which is to be reduced, into said flow through said casing, relatively movable members in said casing and supersonic vibratory means mounted in the casing in a position to be impinged by the gaseous fluid moving therethrough and thereby vibrated supersonically for imparting supersonic energy to the combined flow of gaseous fluid and energy through said casing.

22. A mill for pulverizing solid materials comprising a cylindrical casing, journals on the casing supporting a rotor for rotation therein in a position axially with respect to the casing, a plurality of stages of radial blading on said rotor, each stage comprising a plurality of generally radially extending blades having a radial dimension such that they move in close proximity to the casing walls, said stages being slightly separated, disk means mounted on the rotor between said blade stages for vibration in an axial direction in said space, at least the circumferential margin of said disk means being free to vibrate due to the flow of air thereacross through the clearance space between it and the casing, the circumference of said disk means being closely adjacent the ends of the radial blades and the casing, said apparatus being further characterized in that the disk means are mounted on the rotor for rotation therewith, each disk means being mounted between smaller disks.

23. A mill for pulverizing solid materials comprising a cylindrical casing, journals on the casing supporting a rotor for rotation therein in a position axially with respect to the casing, a plurality of stages of radial blading on said rotor, each stage comprising a plurality of generally radially extending blades having a radial dimension such that they move in close proximity to the casing walls, said stages being slightly separated, disk means mounted on the rotor between said blade stages for vibration in an axial direction in said space, at least the circumferential margin of said disk means being free to vibrate due to the flow of air thereacross through the clearance space between it and the casing, the circumference of said disk means being closely adjacent the ends of the radial blades and the casing, said apparatus being further characterized in that the disk means are mounted on the rotor for rotation therewith, said disk means being slotted in line with said radial blading.

References Cited in the file of this patent

UNITED STATES PATENTS

| Number | Name | Date |
|---|---|---|
| 213,471 | Loufflin | Mar. 18, 1879 |
| 1,157,092 | Du Rell | Oct. 19, 1915 |
| 1,756,253 | Lykken | Apr. 29, 1930 |
| 1,992,938 | Chambers | Mar. 5, 1935 |
| 2,054,280 | Brown | Sept. 15, 1936 |
| 2,163,649 | Weaver | June 27, 1939 |
| 2,225,797 | Plauson | Dec. 24, 1940 |
| 2,235,928 | Hardinge | Mar. 25, 1941 |
| 2,248,526 | Francois | July 8, 1941 |
| 2,294,920 | Lykken | Sept. 8, 1942 |
| 2,329,208 | Lykken | Sept. 14, 1943 |
| 2,360,893 | Robinson | Oct. 24, 1944 |
| 2,363,937 | Brandt | Nov. 28, 1944 |
| 2,400,382 | Arnold | May 14, 1946 |
| 2,428,090 | Naeher et al. | Sept. 30, 1947 |
| 2,441,613 | Balassa | May 18, 1948 |
| 2,453,595 | Rosenthal | Nov. 9, 1948 |
| 2,497,088 | Lykken | Feb. 14, 1950 |
| 2,570,081 | Szczeniowski | Oct. 2, 1951 |
| 2,576,297 | Horsley | Nov. 27, 1951 |

FOREIGN PATENTS

| Number | Country | Date |
|---|---|---|
| 239,060 | Great Britain | Sept. 3, 1925 |
| 452,306 | Germany | Nov. 8, 1927 |
| 469,068 | Great Britain | July 19, 1937 |
| 713,929 | Germany | Nov. 18, 1941 |

OTHER REFERENCES

Engineering and Mining Journal, vol. 148, No. 11, November 1947, page 146, "For Less Expensive Grinding."